United States Patent
Richard

(10) Patent No.: US 8,361,659 B2
(45) Date of Patent: *Jan. 29, 2013

(54) LITHIUM-ALLOYING-MATERIAL/CARBON COMPOSITE

(75) Inventor: Monique N. Richard, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 886 days.

This patent is subject to a terminal disclaimer.

(21) Appl. No.: 12/143,195

(22) Filed: Jun. 20, 2008

(65) Prior Publication Data
US 2009/0317720 A1 Dec. 24, 2009

(51) Int. Cl.
*H01M 4/58* (2010.01)

(52) U.S. Cl. ............ 429/231.8; 429/213; 429/221; 429/224; 429/231.95; 252/583

(58) Field of Classification Search .......... 429/213, 429/231.95, 224, 223, 221, 231.8; 252/583
See application file for complete search history.

(56) References Cited

U.S. PATENT DOCUMENTS

| | | | |
|---|---|---|---|
| 5,772,934 A | 6/1998 | MacFadden | |
| 6,203,944 B1 | 3/2001 | Turner et al. | |
| 6,524,744 B1 | 2/2003 | Clerc et al. | |
| 6,558,847 B1 | 5/2003 | Kawakami et al. | |
| 6,908,706 B2 | 6/2005 | Choi et al. | |
| 7,250,233 B2 | 7/2007 | Choi et al. | |
| 2002/0192557 A1 | 12/2002 | Choi et al. | |
| 2003/0113624 A1 | 6/2003 | Kim et al. | |
| 2003/0207177 A1 | 11/2003 | Matsubara et al. | |
| 2003/0215717 A1 | 11/2003 | Miyaki | |
| 2004/0062990 A1 | 4/2004 | Shimamura et al. | |
| 2004/0214085 A1 | 10/2004 | Sheem et al. | |
| 2008/0145757 A1* | 6/2008 | Mah et al. | 429/219 |
| 2009/0311604 A1* | 12/2009 | Nazar et al. | 429/231.8 |

FOREIGN PATENT DOCUMENTS
JP 63062164 3/1988

* cited by examiner

*Primary Examiner* — Patrick Ryan
*Assistant Examiner* — Alex Usyatinsky
(74) *Attorney, Agent, or Firm* — Gifford, Krass, Sprinkle, Anderson & Citkowski, P.C.

(57) ABSTRACT

An electrode material having carbon and lithium-alloying-material is provided. The carbon is in the form of a porous matrix having nanoporosity and the lithium-alloying-material is sorbed into the nanoporosity of the carbon matrix. The carbon matrix can have a volume of nanoporosity between 10 and 99%. In addition, the lithium-alloying-material can occupy between 5 to 99% of the nanoporosity. A portion of the carbon structure that is only partially filled with the lithium-alloying-material remains vacant providing room for volume expansion on alloying with lithium and allowing electrolyte egress. In some instances, the nanoporosity has nanopores and nanochannels with an average diameter between 1 nanometer and 999 nanometers. The lithium-alloying-material is sorbed into the nanoporosity using liquid transport or other mechanisms providing a material having intimate contact between the electronically conductive carbon structure and the electroactive lithium-alloying-material.

15 Claims, 1 Drawing Sheet

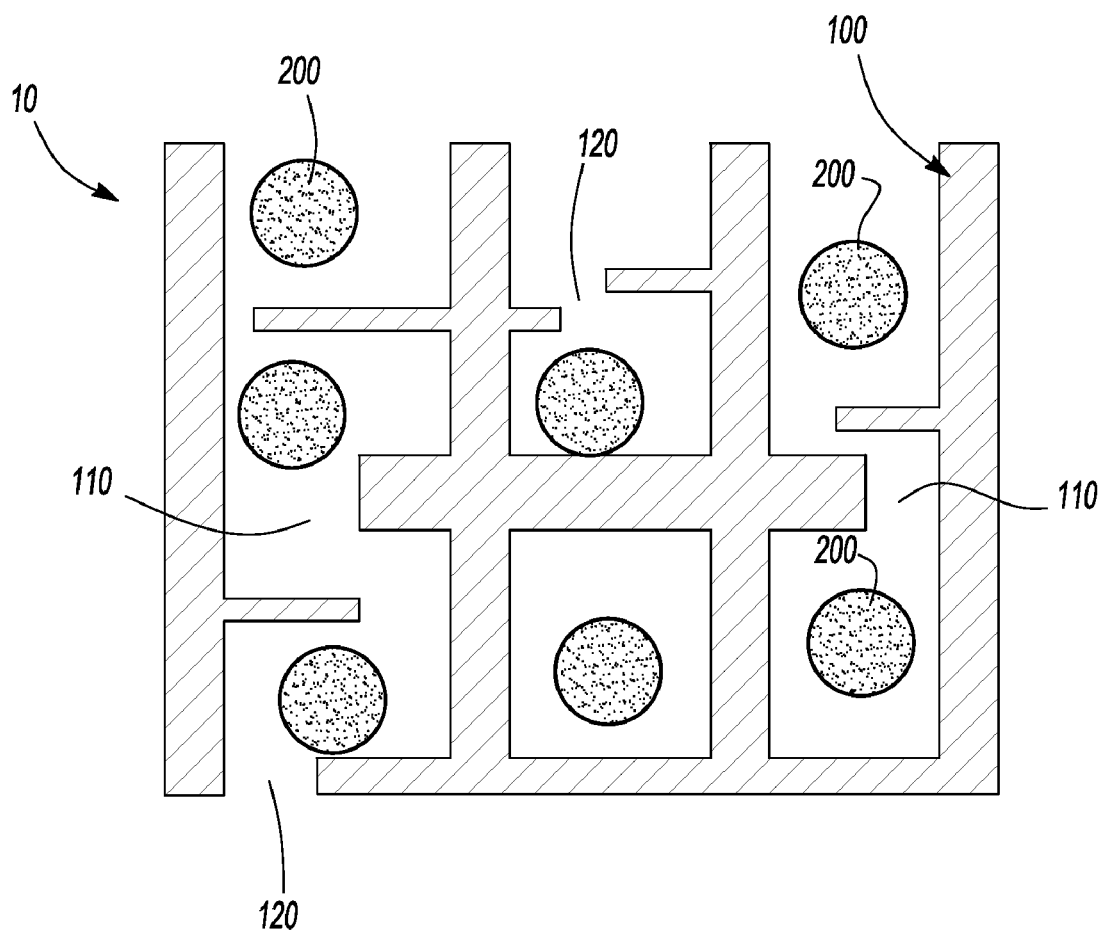

LITHIUM-ALLOYING-MATERIAL/CARBON COMPOSITE

FIELD OF THE INVENTION

The present invention relates to an electrode material, in particular to an electrode material for use in a lithium-ion battery.

BACKGROUND OF THE INVENTION

The energy requirements for batteries are continually increasing, while constraints on volume and mass continue to be present. Further, the demand for safe, low cost and environmentally friendly materials is increasing. These demands and battery specifications cannot be met using traditional lithium-ion battery chemistries. Although lithium-ion batteries have long been optimized and have demonstrated stable energies, these systems are limited by the amount of lithium that can be reversibly inserted and removed from the battery's active material structure.

The requirements for greater performance, safety, low cost and environmentally friendly materials can only be achieved through the development of new battery materials. Researchers have proposed the replacement of the carbon-based anode with tin. Tin alloys with lithium during the charging of the battery. The lithium-tin alloy forms a maximum concentration of 4.4 lithium atoms per tin atom, a concentration which equals a capacity of 993 mAh/g. A traditional carbon-based anode has a theoretical capacity of 372 mAh/g. Therefore, the replacement of traditional carbon-based anode batteries with tin-based anode batteries could result in higher energy capabilities. In addition, other lithium-alloying materials could be considered as a replacement to carbon-based anode batteries. However, research has shown that there are two main issues with the use of a tin-based and other lithium-alloying material anode systems, the first being a poor cycle life and the second being a poor utilization of the tin. Therefore, there is a need for an improved lithium battery that exhibits increased energy density with adequate cycle life and proper utilization of the battery materials.

SUMMARY OF THE INVENTION

An electrode material having a lithium-alloying-material/carbon composite is provided. The carbon is in the form of a porous matrix having nanoporosity and the lithium-alloying-material is sorbed into the nanoporosity of the carbon matrix. The carbon matrix can have a volume of nanoporosity between 10 and 99%. In addition, the lithium-alloying-material can occupy at least 5% and less than 100% of the nanoporosity and can be made of elements that alloy with lithium, illustratively including tin, silicon, aluminum, germanium and alloys thereof. A portion of the carbon structure that is only partially filled with the lithium-alloying-material remains vacant allowing electrolyte egress. The empty space also provides room for the volume expansion of the lithium-alloying material, e.g. tin, upon alloying with lithium. Creation of a composite with inherent volume or free space for expansion prevents damage to the composite, and thus the electrode, during normal battery operation.

In some instances, the nanoporosity has nanopores and nanochannels with an average diameter between 1 nanometer and 999 nanometers. The lithium-alloying-material is sorbed into the nanoporosity using liquid transport or other mechanisms providing a material having intimate contact between the electronically conductive carbon structure and the electroactive lithium-alloying-material. In addition, the lithium-alloying-material can be present as the lithium-alloying-material alone and/or as the lithium-alloying-material alloyed with lithium. The sorbed material can be in the form of particles and/or coatings within the nanochannels or nanopores, and if present as particles, have an outer dimension that is greater than the narrowest portion of the nanochannel or nanopore where the particle is located.

BRIEF DESCRIPTION OF THE FIGURES

FIG. 1 is a schematic diagram illustrating the structure of an embodiment.

DETAILED DESCRIPTION OF THE INVENTION

The present invention discloses a lithium-alloying-material/carbon (LAM/C) composite for use in an electrochemical device. As such, the LAM/C composite has utility as an electroactive material in a battery.

The LAM/C composite includes a body containing carbon and a lithium-alloying-material. The carbon is in the form of a high surface area and porous matrix having nanoporosity. The lithium-alloying-material is sorbed into the nanoporosity of the porous matrix such that the nanoporosity is only partially filled with lithium-alloying-material and can be present as discrete particles, coatings, and combinations thereof. Only partially filling of the nanoporosity with lithium-alloying-material affords for the diffusion or migration of an electrolyte through the nanoporosity to reach the lithium-alloying-material. In contrast, if the nanoporosity were filled with lithium-alloying-material, migration of the electrolyte to the lithium-alloying-material within the nanoporosity would not be possible.

For the purposes of the present invention; nanoporosity is defined as porosity within a matrix with pores, passages, channels and the like having an average mean diameter of equal to or less than 999 nanometers; the term sorbed is defined as taken up and held; and the term lithium-alloying-material is defined as one or more elements that alloy with lithium to form an alloy, intermetallic compound and the like.

A lithium-alloying-material such as tin, silicon and the like is not prone to dissolution into the electrolyte, and thus in at least this aspect, the use of such a material is different from the use of sulfur as an electrode material. In addition, the free space within the composite affords the composite to: (1) allow the lithium-alloying-material to contact the electrolyte and thus alloy with lithium; and (2) accommodate the volume expansion of the resulting lithium-alloying-material plus lithium alloy as the lithium content increases.

Turning now to FIG. 1, an illustrative schematic representing a possible structure of the LAM/C composite is shown generally at reference numeral 10. The composite 10 has a carbon matrix 100, the carbon matrix 100 having channels 110 and pores 120. The channels 110 and the pores 120 define a porosity within the carbon matrix 100. It is appreciated that the drawing in FIG. 1 is two-dimensional and that the channel 110 would extend into and out of the plane of the paper. In some instances, the channels 110 are nanochannels and the pores 120 are nanopores, with nanopores and nanochannels defined as pores and channels, respectively, having an average mean diameter equal to or less than 999 nanometers. Average mean diameter is defined as the average of three orthogonal diameter measurements for a pore and the average of two orthogonal diameter measurements for a channel.

The nanochannels and the nanopores can have an average mean diameter between 1 nanometer and 999 nanometers. In some instances, the nanochannels and the nanopores can have an average mean diameter between 1 nanometer and 50 nanometers. In still other instances, the nanochannels and nanopores can have an average mean diameter between 1 nanometer and 30 nanometers. In still yet other instances, the nanochannels and nanopores can have an average mean diameter between 1 nanometer and 20 nanometers. It is appreciated that the schematic shown in FIG. 1 is for illustrative purposes only and that any high surface area carbon structure, such as but not limited to aerogels, xerogels, absorbants, molecular sieves, catalytic supports and the like fall within the scope of the LAM/C composite disclosed herein.

In some instances a lithium-alloying-material 200 at least partially within the carbon matrix 100 can be imbibed into the void space of the carbon matrix using any liquid and/or vapor deposition method known to those skilled in the art, illustratively including liquid intrusions from a lithium-alloying-material melt, solution intrusion, chemical vapor deposition (CVD) methods and physical vapor deposition (PVD) methods. In other instances, the carbon matrix 100 with the lithium-alloying-material 200 at least partially therein is produced in a single step. Although illustrated in FIG. 1 as discrete particles, this is not required.

The lithium-alloying-material 200 can also be present within the carbon matrix 100 as a pre-lithiated lithium-alloying-material. For example and for illustrative purposes only, the lithium-alloying-material 200 can be present as tin, silicon, aluminum, germanium and/or alloys thereof including lithium alloys, copper-tin alloys and the like.

The lithium-alloying-material 200 can be present as a coating within the channels 110 and/or pores 120, and/or the lithium-alloying-material 200 can partially fill the channels 110 and/or pores 120. In some instances, the lithium-alloying-material 200 partially fills the channels 110 and/or pores 120 between 5% and less than 100%. In other instances, the lithium-alloying-material 200 partially fills the channels 110 and/or pores 120 between 50% and less than 100%, while in still yet other instances between 75% and less than 100%. It is appreciated that the remaining volume, also known as free volume, of the channels 110 and/or pores 120 that is not filled with lithium-alloying-material 200 can be vacant and will be filled with the expansion of the lithium-alloying-material as it alloys with lithium, thereby forcing or pushing the electrolyte out of these spaces. Stated differently, after the lithium-alloying-material 200 partially fills the nanoporosity of the carbon matrix 100, there is free volume available within the channels 110 and pores 120. It is also appreciated that the amount of the lithium-alloying-material 200 that is present as part of the LAM/C composite 10 can be varied by the degree or extent of liquid or vapor deposition of the lithium-alloying-material 200.

Not being bound by theory, incorporation of the lithium-alloying-material 200 into the void space of the carbon matrix 100, where the void space is not completely filled, results in an improved composite which inherently compensates for the volume expansion of the lithium-alloying-material as it alloys with lithium.

As will be clear to those skilled in the art, mixing of the lithium-alloying-material and carbon can be accomplished using a variety of methods, including, but not limited to, ball milling, grinding, melting, evaporation, and/or vacuum treatment. The density of carbon is relatively low such that the addition of up to 30 wt % of carbon to an electrode can still provide useful energy for a battery.

While the invention has been described in detail and with reference to a specific example, it is appreciated that various changes and modifications can be made without departing from the spirit and scope thereof.

I claim:

1. A material comprising:
carbon and a lithium-alloying-material;
said carbon in the form of a porous matrix having a nanoporosity, said nanoporosity having a volume; and
said lithium-alloying-material sorbed into a portion of said nanoporosity of said carbon matrix such that said lithium-alloying-material occupies more than 50% and less than 100% of said nanoporosity volume and there is free volume available within said nanoporosity volume.

2. The material of claim 1, wherein said matrix has between 10% and 99% of said nanoporosity volume.

3. The material of claim 2, wherein said lithium-alloying-material occupies more than 75% and less than 100% of said nanoporosity volume.

4. The material of claim 1, wherein said nanoporosity volume has nanopores and nanochannels with an average diameter between 1 nanometer and 999 nanometers.

5. The material of claim 4, wherein said nanopores and said nanochannels have an average diameter between 1 nanometer and 50 nanometers.

6. The material of claim 4, wherein said nanopores and said nanochannels have an average diameter between 1 nanometer and 30 nanometers.

7. The material of claim 4, wherein said nanopores and said nanochannels have an average diameter between 1 nanometer and 20 nanometers.

8. The material of claim 4, wherein said lithium-alloying-material is selected from the group consisting of tin, silicon, aluminum, germanium and alloys thereof.

9. An electrode comprising the material according to claim 1.

10. The electrode of claim 9, further comprising a binding compound, other additives and combinations thereof.

11. A battery having:
a negative electrode according to claim 9;
an electrolyte; and
a positive electrode.

12. A material comprising:
carbon and a lithium-alloying-material;
said carbon in the form of a porous matrix having nanopores and nanochannels defining a porosity, said porosity having a volume and said nanopores and said nanochannels having an average diameter between 1 nanometer and 999 nanometers; and
said lithium-alloying-material sorbed into a portion of said nanopores and said nanochannels of said carbon matrix and occupying more than 50% and less than 100% of said porosity volume such that is free volume available within said porosity volume.

13. The material of claim 12, wherein said matrix has between 10% and 99% of said porosity volume.

14. The material of claim 13, wherein said lithium-alloying-material is selected from the group consisting of tin, silicon, aluminum, germanium and alloys thereof.

15. A battery having a carbon and lithium-alloying-material electrode, the battery comprising:
a positive electrode containing lithium;
an electrolyte;
a negative electrode, said negative electrode having:
a porous carbon matrix having nanopores and nanochannels defining a nanoporosity, said nanoporosity having a volume and said nanopores and said nanochannels having an average diameter between 1 nanometer and 999 nanometers; and a lithium-alloying-material sorbed into a portion of said nanopores and said nanochannels of said carbon matrix and occupying more than 50% and less than 100% of said nanoporosity volume such that there is free volume available within said nanoporosity volume.

* * * * *

UNITED STATES PATENT AND TRADEMARK OFFICE
CERTIFICATE OF CORRECTION

| | | |
|---|---|---|
| PATENT NO. | : 8,361,659 B2 | Page 1 of 1 |
| APPLICATION NO. | : 12/143195 | |
| DATED | : January 29, 2013 | |
| INVENTOR(S) | : Monique N. Richard | |

It is certified that error appears in the above-identified patent and that said Letters Patent is hereby corrected as shown below:

In the Specification:

At column 4, line number 51, Insert --there--, After --that--

Signed and Sealed this
Second Day of September, 2014

Michelle K. Lee
*Deputy Director of the United States Patent and Trademark Office*